United States Patent
Xiao et al.

(10) Patent No.: US 8,334,974 B2
(45) Date of Patent: Dec. 18, 2012

(54) METHOD AND APPARATUS FOR DETECTING POLARIZING DIRECTION OF ELECTROMAGNETIC WAVE

(75) Inventors: Lin Xiao, Beijing (CN); Yu-Ying Zhang, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 465 days.

(21) Appl. No.: 12/590,662

(22) Filed: Nov. 12, 2009

(65) Prior Publication Data

US 2010/0296088 A1    Nov. 25, 2010

(30) Foreign Application Priority Data

May 19, 2009    (CN) ............................ 2009 1 0107490

(51) Int. Cl.
*G01J 3/43* (2006.01)
*G01J 4/00* (2006.01)
(52) U.S. Cl. ........................................ 356/319; 356/364
(58) Field of Classification Search .......... 356/364–369, 356/319, 322; 250/472.1; 977/954, 788; 720/718
See application file for complete search history.

(56) References Cited

U.S. PATENT DOCUMENTS

| | | | |
|---|---|---|---|
| 6,628,053 B1 * | 9/2003 | Den et al. ..................... | 313/310 |
| 6,682,677 B2 * | 1/2004 | Lobovsky et al. ........ | 264/172.11 |
| 7,070,472 B2 * | 7/2006 | Dean et al. ..................... | 445/24 |
| 7,085,351 B2 * | 8/2006 | Lu et al. ......................... | 378/122 |
| 7,130,047 B2 * | 10/2006 | Chinnock et al. ............. | 356/364 |
| 7,335,908 B2 * | 2/2008 | Samuelson et al. ............ | 257/12 |
| 7,671,522 B2 * | 3/2010 | Lee et al. ....................... | 313/289 |
| 7,915,598 B2 * | 3/2011 | Jiang et al. ................. | 250/472.1 |
| 8,119,032 B2 * | 2/2012 | Gordon et al. ................ | 252/502 |
| 2002/0006489 A1 * | 1/2002 | Goth et al. ................... | 428/36.9 |
| 2004/0047038 A1 | 3/2004 | Jiang et al. | |
| 2005/0097179 A1 * | 5/2005 | Orme ............................ | 709/207 |
| 2005/0174028 A1 * | 8/2005 | Jung et al. .................... | 313/309 |
| 2006/0075418 A1 * | 4/2006 | Kurt et al. .................... | 720/718 |

(Continued)

FOREIGN PATENT DOCUMENTS

CN    101275867 A    10/2008
(Continued)

OTHER PUBLICATIONS

Bolometric infrared photoresponse of suspended single-walled carbon nanotube films, Science, Mikhail E. Itkis et al, vol. 312, p. 413-416 (2006).

*Primary Examiner* — Sang Nguyen
(74) *Attorney, Agent, or Firm* — Altis Law Group, Inc.

(57) ABSTRACT

A method for detecting polarizing direction of electromagnetic wave includes disposing a carbon nanotube structure in a vacuum environment, irradiating a surface of the carbon nanotube structure by an electromagnetic wave with a polarizing direction while rotating the carbon nanotube structure, and determining the polarizing direction of the electromagnetic wave according to change of the visible light emitted from the carbon nanotube structure. The carbon nanotube structure includes a plurality of carbon nanotubes arranged along a substantially same direction. The carbon nanotube structure can absorb the electromagnetic wave and emit a visible light. The rotating axis is substantially perpendicular to the surface of the carbon nanotube structure irradiated by the electromagnetic wave.

22 Claims, 10 Drawing Sheets

U.S. PATENT DOCUMENTS

| | | |
|---|---|---|
| 2008/0067619 A1 | 3/2008 | Farahani et al. |
| 2008/0170982 A1* | 7/2008 | Zhang et al. ............... 423/447.3 |
| 2009/0088040 A1* | 4/2009 | Nishimura et al. ............ 445/51 |
| 2009/0279390 A1 | 11/2009 | Jiang et al. |
| 2010/0000989 A1 | 1/2010 | Feng et al. |
| 2010/0019171 A1* | 1/2010 | Jiang et al. ................. 250/473.1 |
| 2010/0039015 A1 | 2/2010 | Liu et al. |
| 2010/0122980 A1 | 5/2010 | Wang et al. |

FOREIGN PATENT DOCUMENTS

| | | |
|---|---|---|
| CN | 101610613 | 12/2009 |
| JP | 2000-218151 | 8/2000 |
| JP | 2004-102217 | 4/2004 |
| SE | 510022 | 4/1999 |

* cited by examiner

METHOD AND APPARATUS FOR DETECTING POLARIZING DIRECTION OF ELECTROMAGNETIC WAVE

RELATED APPLICATIONS

This application is related to copending application Ser. Nos. 12/459,546, filed Jul. 2, 2009, entitled, "METHOD AND DEVICE FOR MEASURING ELECTROMAGNETIC SIGNAL," and Ser. No. 12/462,734, filed Aug. 6, 2009, entitled, "APPARATUS FOR DETECTING ELECTROMAGNETIC WAVE."

BACKGROUND

1. Technical Field

The present disclosure relates to methods and apparatus for detecting polarizing direction of electromagnetic waves and, particularly, to a carbon nanotube based method and apparatus for detecting polarizing direction of electromagnetic waves.

2. Description of Related Art

Polarizing direction is an important property of an electromagnetic wave. One method for detecting the polarizing direction of visible light includes disposing a polarizer and a target in the path of the visible light, and rotating the polarizer. The polarized visible light goes through the polarizer and irradiates the target. As the polarizer rotates, the light on the target changes periodically from dark to bright. When the light on the target is at its darkest, the polarizing direction of the visible light is perpendicular to the polarizing direction of the polarizer. When the light on the target is at its brightest, the polarizing direction of the visible light is parallel to the polarizing direction of the polarizer.

However, the above observational methods for determining the polarizing direction are not suitable for invisible light such as infrared, ultraviolet, and other wavelengths. In general, to detect the polarizing direction of invisible light, a photoelectric sensor is disposed at the target position. Thus, the invisible light is transformed to electric signals, and the electric signals can be measured.

However, the method for detecting the invisible light is complicated and requires many optical and electrical devices. In addition, the conventional polarizer can only achieve good polarization in certain regions of the electromagnetic spectra, (e.g. microwave, infrared, visible light, ultraviolet, etc.), and does not achieve uniform polarization over the entire spectrum. Thus, when the wavelength of the light changes, the polarizer has to be changed accordingly.

Carbon nanotubes (CNT) are a novel carbonaceous material having an extremely small size and an extremely large specific surface area. Carbon nanotubes have received a great deal of interest since the early 1990s, because they have interesting and potentially useful electrical and mechanical properties, and have been widely used in a plurality of fields. A disordered carbon nanotube film based apparatus for detecting electromagnetic waves is disclosed in "Bolometric infrared photoresponse of suspended single-walled carbon nanotube films," Science, Mikhail E. Itkis et al, vol 312, P412 (2006). Carbon nanotubes have a uniform absorbability of electromagnetic waves having different wavelengths. When the disordered carbon nanotube film is irradiated by electromagnetic waves having different wavelengths, the resistance of the disordered carbon nanotube film changes. Thus, the intensity of the incident electromagnetic wave can be detected by detecting the resistance of the irradiated disordered carbon nanotube film.

However, the above apparatus can only detect the intensity of an electromagnetic wave, and not the polarizing direction thereof. Further, to detect the resistance, complicated additional apparatuses must be used.

What is needed, therefore, is to provide a simpler method and apparatus for detecting polarizing direction of an electromagnetic wave.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

DETAILED DESCRIPTION

Figure 1:
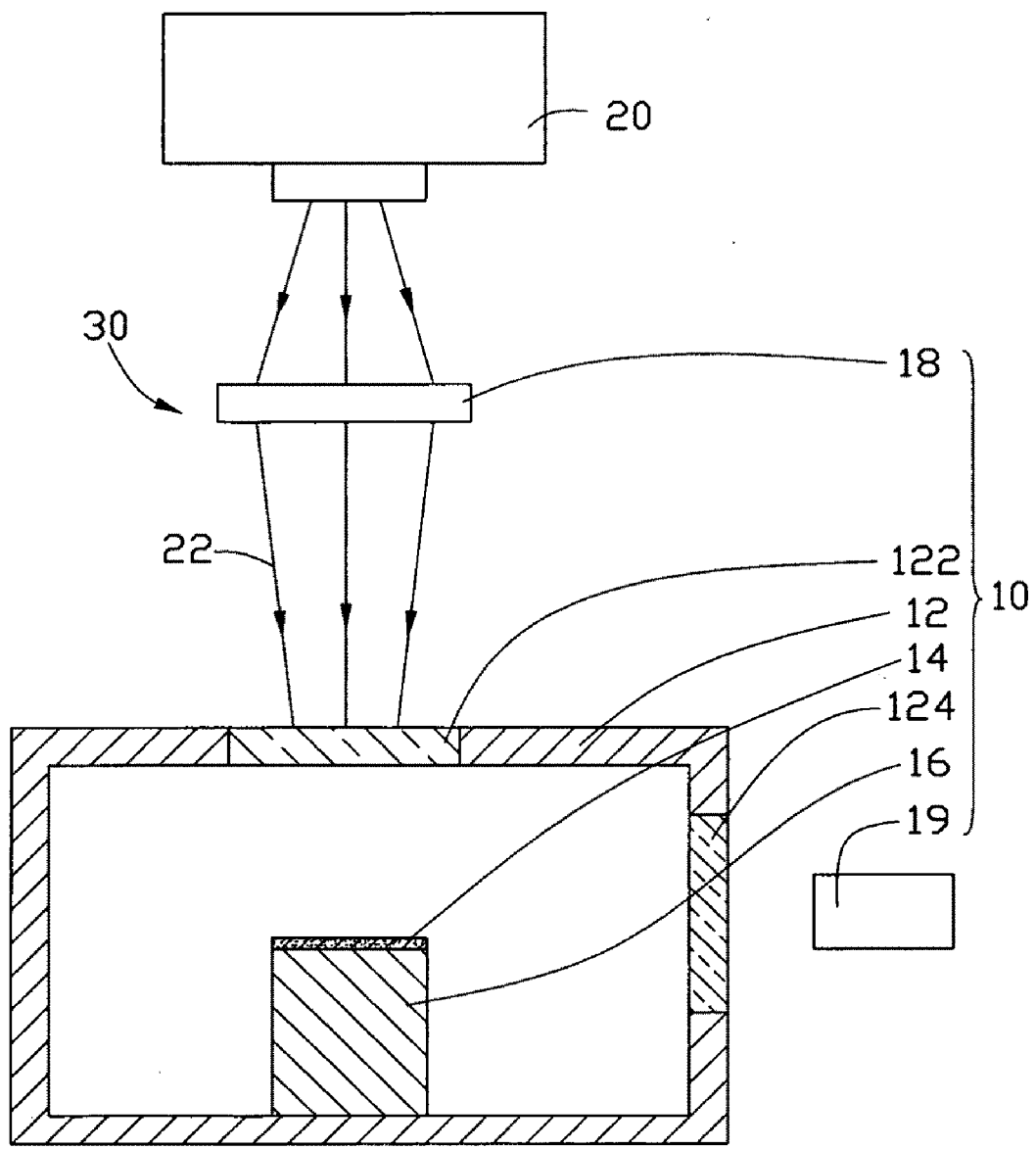
FIG. 1 is a schematic view of an embodiment of an apparatus for detecting polarization of electromagnetic waves.

Referring to FIG. 1, an embodiment of a method for detecting polarizing direction of an electromagnetic wave can include the following steps of:

(a) providing an apparatus 10 for detecting the polarizing direction of the electromagnetic wave, the apparatus 10 including a vacuum chamber 12 and a carbon nanotube structure 14 disposed in the vacuum chamber 12, the carbon nanotube structure 14 including a plurality of carbon nanotubes approximately aligned along a same direction;

(b) providing an electromagnetic wave emission source 20 to emit an electromagnetic wave 22, irradiating a surface of the carbon nanotube structure 14 with the electromagnetic wave 22, and the carbon nanotube structure 14 absorbing the electromagnetic wave 22 and emitting a visible light in the vacuum chamber 12; and (c) rotating the carbon nanotube structure 14 to change the angle between the polarizing direction of the electromagnetic wave 22 and the length orientation of the carbon nanotubes in the carbon nanotube structure 14 while irradiating the carbon nanotube structure 14 with the electromagnetic wave 22.

In step (a), the carbon nanotube structure 14 is made of only of a plurality of carbon nanotubes. The carbon nanotubes in the carbon nanotube structure 14 can be substantially aligned along a same direction, and substantially parallel to a surface of the carbon nanotube structure 14. The carbon nanotubes in the carbon nanotube structure 14 can be single-walled, double-walled, or multi-walled carbon nanotubes. A diameter of each single-walled carbon nanotube ranges from about 0.5 nanometers (nm) to about 50 nm. A diameter of each double-walled carbon nanotube ranges from about 1 nm to about 50 nm. A diameter of each multi-walled carbon nanotube ranges from about 1.5 nm to about 50 nm.

The carbon nanotube structure 14 can be a free-standing structure. The free-standing structure means the carbon nanotube structure 14 can keep a certain shape without any supporter, which is different from a powder or a liquid. The carbon nanotube structure 14 includes a plurality of carbon nanotubes combined by van der Waals attractive force therebetween, thereby forming a certain shape. The carbon nanotube structure 14 includes at least one carbon nanotube film, at least one carbon nanotube wire structure, or a combination thereof.

Carbon Nanotube Film

Figure 2:
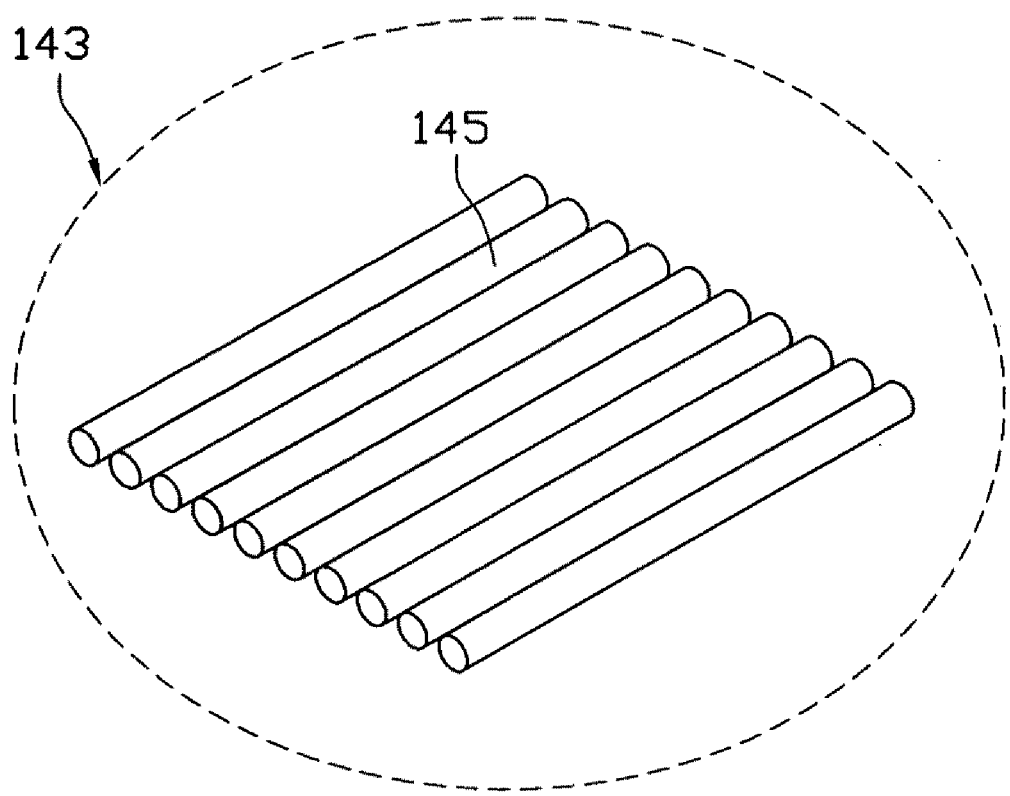
FIG. 2 is a structural schematic view of a carbon nanotube segment in a drawn carbon nanotube film used in the apparatus of FIG. 1.

The carbon nanotubes in the carbon nanotube film are substantially aligned along a same direction, and substantially parallel to a surface of the carbon nanotube film. In one embodiment, the carbon nanotube film includes at least one carbon nanotube segment. Referring to FIG. 2, each carbon nanotube segment 143 includes a plurality of carbon nanotubes 145 approximately parallel to each other, and combined by van der Waals attractive force therebetween. The carbon nanotube segments 143 can vary in width, thickness, uniformity and shape. The carbon nanotubes 145 in the carbon nanotube segments 143 are also oriented along a preferred orientation.

Carbon Nanotube Film Manufactured by Method 1

Figure 3:
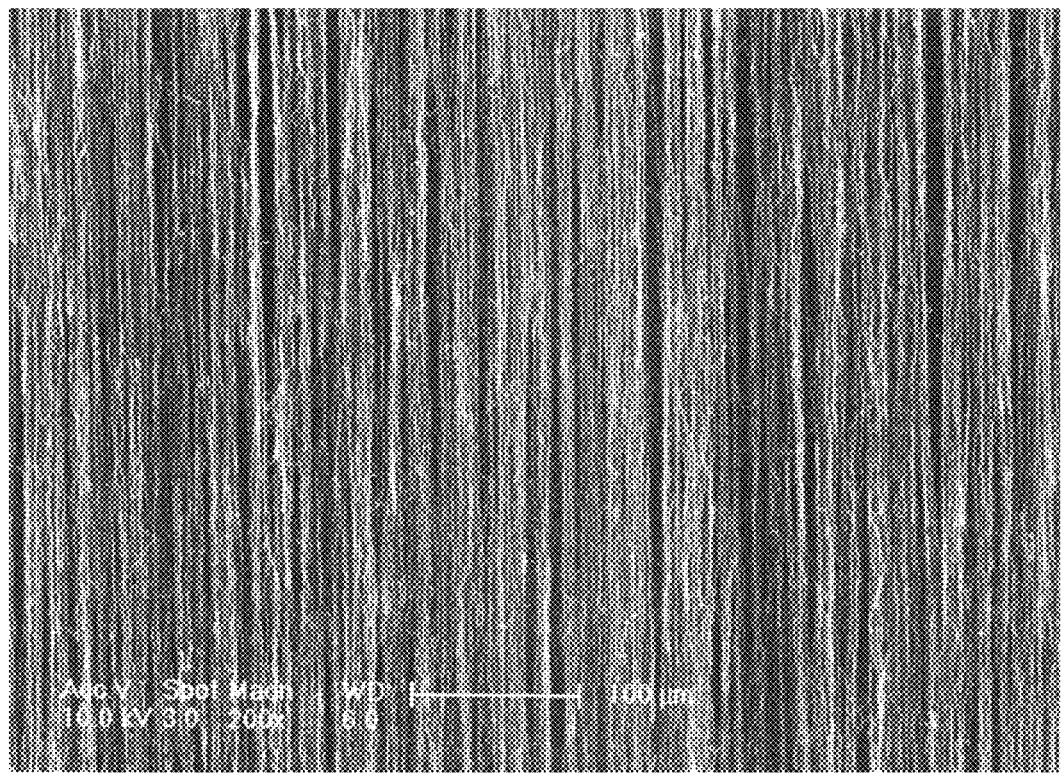
FIG. 3 shows a Scanning Electron Microscope (SEM) image of the drawn carbon nanotube film used in the apparatus of FIG. 1.

In one embodiment, the carbon nanotube film can be drawn from a carbon nanotube array to form a drawn carbon nanotube film. The drawn carbon nanotube film can be pulled out from a super-aligned carbon nanotube array on a substrate. The drawn carbon nanotube film includes a plurality of successive and oriented carbon nanotubes 145 joined end to end by van der Waals attractive force. Referring to FIGS. 2 and 3, each drawn carbon nanotube film includes a plurality of successively oriented carbon nanotube segments 143 joined end-to-end by van der Waals attractive force therebetween. The thickness of the drawn carbon nanotube film is in a range from about 0.5 nm to about 100 micrometers ($\mu$m). The drawn carbon nanotube film is a free-standing film.

Carbon Nanotube Film Manufactured by Method 2

Figure 4:
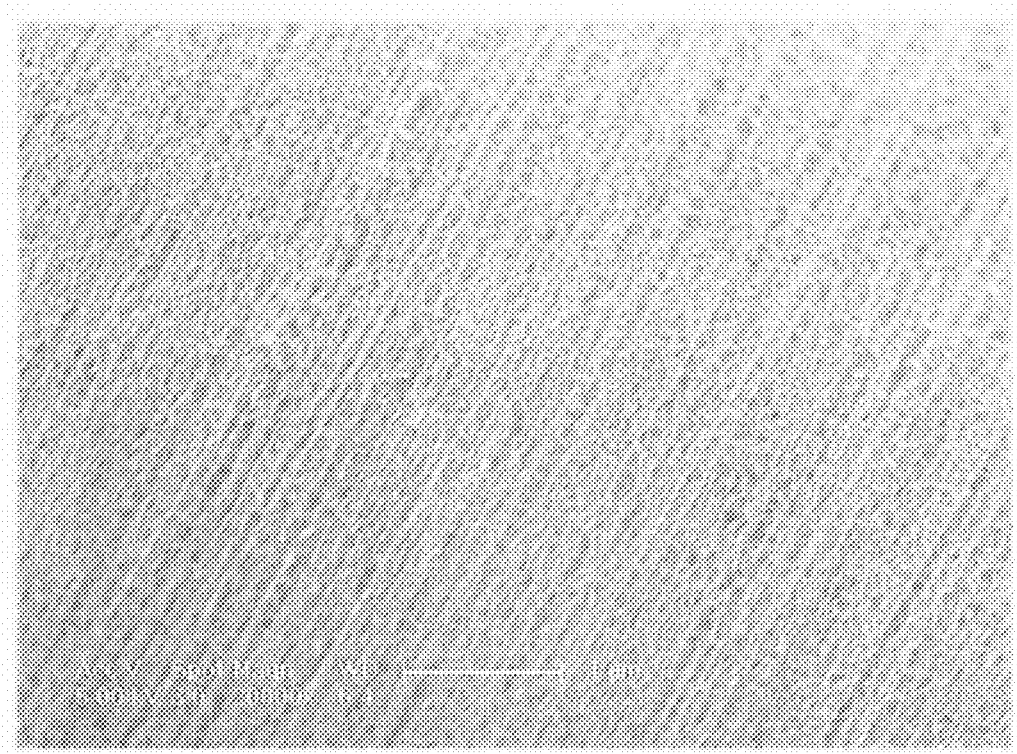
FIG. 4 shows an SEM image of another carbon nanotube film used in the apparatus of FIG. 1.

In another embodiment, the carbon nanotube film includes one carbon nanotube segment 143. Referring to FIG. 4, the carbon nanotube segment 143 includes a plurality of carbon nanotubes 145 substantially arranged along a same direction. The carbon nanotubes 145 in the carbon nanotube film are substantially parallel to each other and have almost equal lengths, and are combined side by side via van der Waals attractive force therebetween. The width of the carbon nanotube film is equal to the length of the carbon nanotubes 145, thus at least one carbon nanotube 145 spans the entire width of the carbon nanotube film. The carbon nanotube film can be produced by growing a strip-shaped carbon nanotube array, and pushing the strip-shaped carbon nanotube array down along a direction substantially perpendicular to a length of the strip-shaped carbon nanotube array, and has a length of about 20 $\mu$m to about 10 millimeters (mm). The length of the carbon nanotube film is only limited by the length of the strip. A larger carbon nanotube film also can be formed by having a plurality of these strips lined up side by side and folding the carbon nanotubes 145 grown thereon over such that there is overlap between the carbon nanotubes 145 on adjacent strips.

Carbon Nanotube Film Manufactured by Method 3

In some embodiments, the carbon nanotube film including one carbon nanotube segment 143 can also be produced by a method adopting a "kite-mechanism." The carbon nanotube film can have carbon nanotubes 145 with a length greater than 10 centimeters (cm). Specifically, the carbon nanotube film can be produced by providing a growing substrate with a catalyst layer located thereon, placing the growing substrate adjacent to the insulating substrate in a chamber, heating the chamber to a growth temperature for carbon nanotubes 145 under a protective gas, introducing a carbon source gas along a gas flow direction, and growing a plurality of carbon nanotubes 145 on the insulating substrate. After introducing the carbon source gas into the chamber, the carbon nanotubes 145 will start to grow under the effect of the catalyst. One end (e.g., the root) of the carbon nanotubes 145 is fixed on the growing substrate, and the other end (e.g., the top/free end) of the carbon nanotubes 145 grow continuously. The growing substrate is near an inlet of the introduced carbon source gas, such that the carbon nanotubes 145 float above the insulating substrate with the roots of the carbon nanotubes 145 still attached on the growing substrate, as the carbon source gas is continuously introduced into the chamber. The length of the carbon nanotubes 145 depends on the growth conditions. After growth has been stopped, the carbon nanotubes land on the insulating substrate. The carbon nanotubes 145 roots are then separated from the growing substrate. This can be repeated many times to obtain many layers of carbon nanotube films on a single insulating substrate. The adjacent carbon nanotubes 145 can be adhered together by van der Waals attractive force therebetween and being substantially parallel to each other, with the distance of adjacent carbon nanotubes 145 being less than 5 $\mu$m.

The carbon nanotube structure 14 can include at least two stacked and/or coplanar carbon nanotube films. These coplanar carbon nanotube films can also be stacked one or more upon other films. The carbon nanotubes 145 in two adjacent carbon nanotube films are substantially parallel. Adjacent carbon nanotube films can be combined only by the van der Waals attractive force therebetween. The number of the layers of the carbon nanotube films is not limited, so that a carbon nanotube structure 14 can have different widths and areas. Stacking the carbon nanotube films will add to the structural strength of the carbon nanotube structure 14.

Carbon Nanotube Wire Structure

Figure 5:
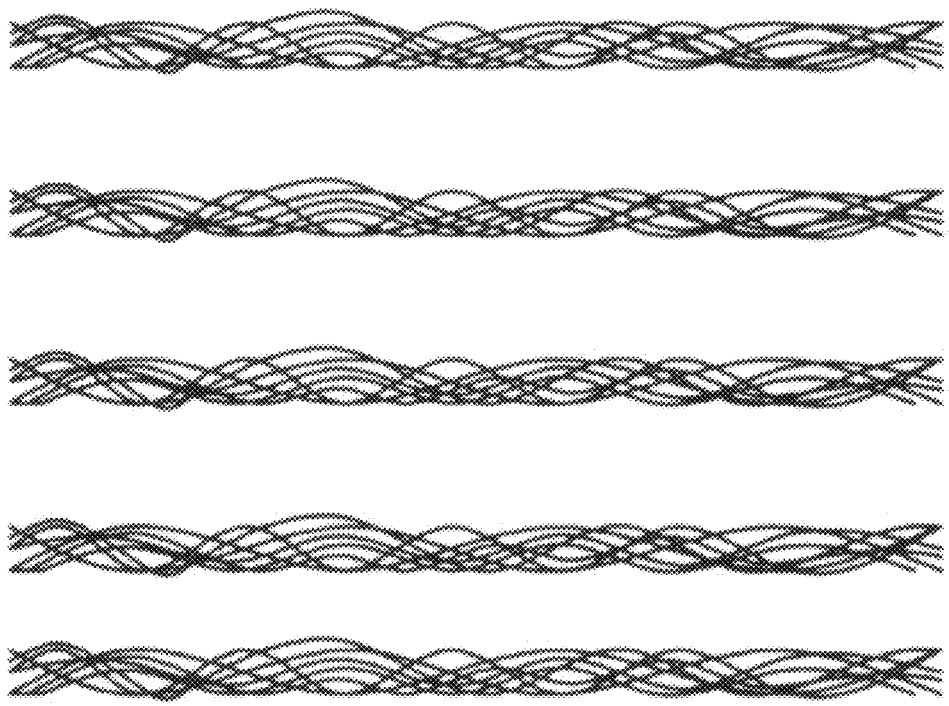
FIG. 5 is a structural schematic view of a plurality of carbon nanotube wire structures substantially parallel to each other in a plane in the apparatus of FIG. 1.
Figure 6:
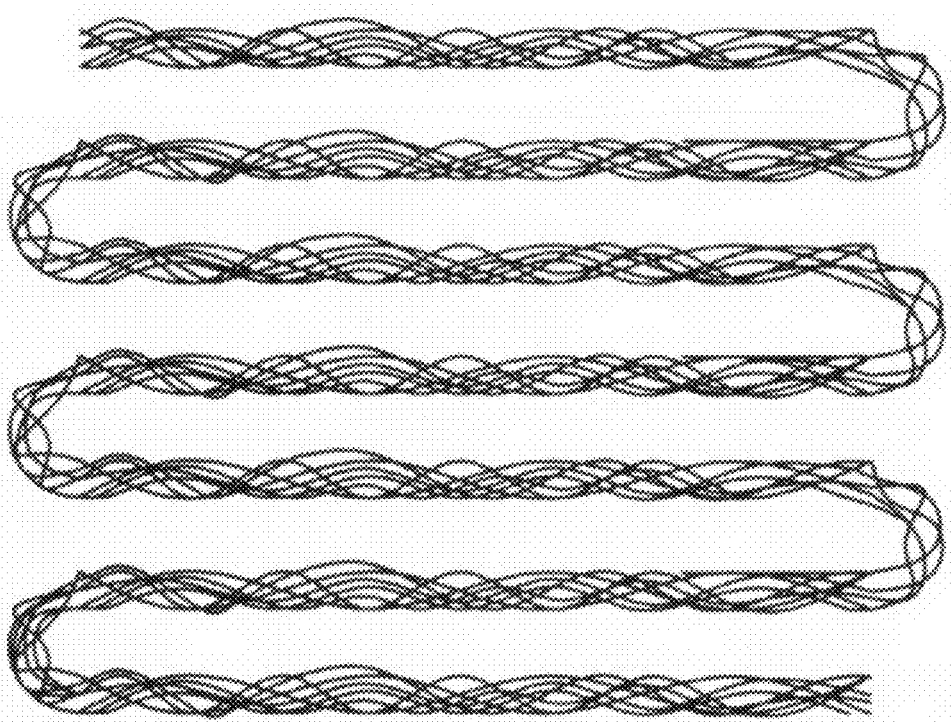
FIG. 6 is a structural schematic view of a carbon nanotube wire structure bent orderly in a plane in the apparatus of FIG. 1.

In other embodiments, the carbon nanotube structure 14 includes one or more carbon nanotube wire structures. The carbon nanotube wire structure includes carbon nanotube cables that include twisted carbon nanotube wires, untwisted carbon nanotube wires, or combinations thereof. The carbon nanotube cable includes carbon nanotube wires, twisted or untwisted, that are twisted or bundled together. The carbon nanotube wires in the carbon nanotube wire structure can be substantially parallel to each other to form a bundle-like structure or twisted with each other to form a twisted structure. Referring to FIG. 5, when the carbon nanotube structure 14 includes a plurality of carbon nanotube wire structures, the carbon nanotube wire structures can be coplanar and substantially parallel to each other, or stacked and substantially parallel to each other. Adjacent carbon nanotube wire structures can contact to each other. Referring to FIG. 6, when the carbon nanotube structure 14 includes one carbon nanotube wire structure, the carbon nanotube wire structure can be bent orderly in a plane, thereby forming a film-shaped structure, and the carbon nanotube wires of the carbon nanotube wire structure are parallel to each other and arranged side by side besides the bend portions.

Figure 7:
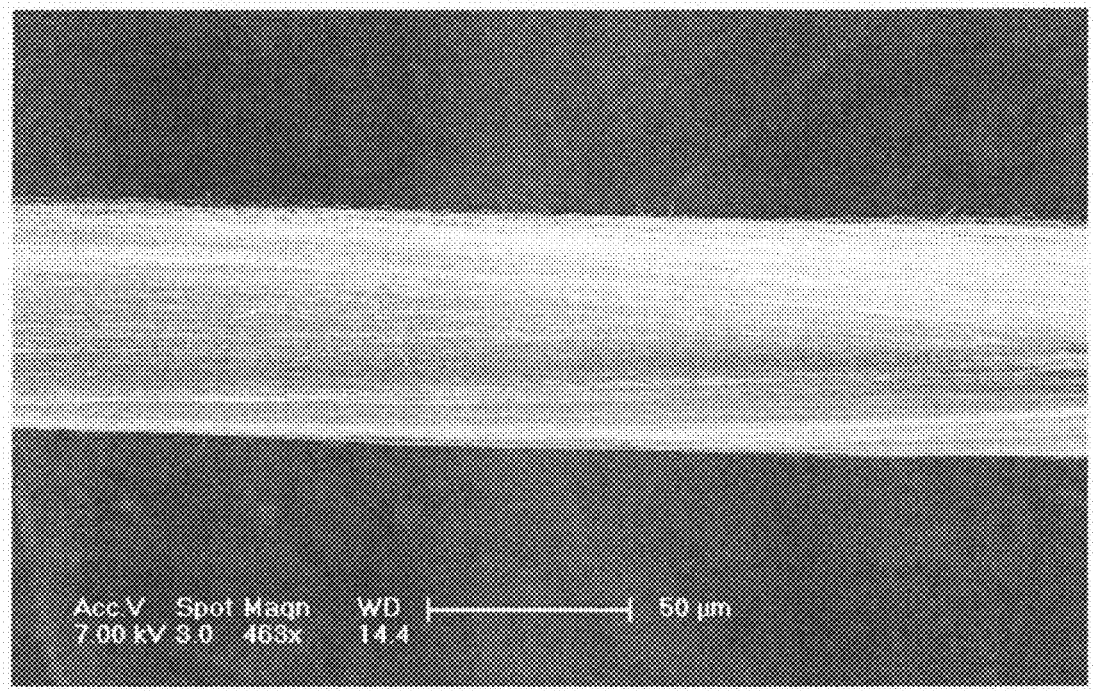
FIG. 7 is an SEM image of a non-twisted carbon nanotube wire used in the apparatus of FIG. 1.

The non-twisted carbon nanotube wire can be formed by treating the drawn carbon nanotube film with an organic solvent. Specifically, the drawn carbon nanotube film is treated by applying the organic solvent to the drawn carbon nanotube film to soak the entire surface of the drawn carbon nanotube film. After being soaked by the organic solvent, the adjacent parallel carbon nanotubes in the drawn carbon nanotube film will bundle together, due to the surface tension of the volatile organic solvent as the organic solvent volatilizes, and thus, the drawn carbon nanotube film will be shrunk into a non-twisted carbon nanotube wire. Referring to FIG. 7, the non-twisted carbon nanotube wire includes a plurality of carbon nanotubes substantially oriented along a same direction (e.g., a direction along the length of the non-twisted carbon nanotube wire). The carbon nanotubes are substantially parallel to the axis of the non-twisted carbon nanotube wire. Specifically, the non-twisted carbon nanotube wire includes a plurality of carbon nanotube segments joined end-to-end by van der Waals attractive force therebetween. Each carbon nanotube segment includes a plurality of carbon nanotubes substantially parallel to each other and combined by van der Waals attractive force. A length of the non-twisted carbon nanotube wire can be arbitrarily set as desired. A diameter of the non-twisted carbon nanotube wire can range from about 0.5 nm to about 100 μm. In one embodiment, the diameter of the non-twisted carbon nanotube wire is about 50 μm. Examples of the non-twisted carbon nanotube wire is taught by US Patent Application Publication US 2007/0166223 to Jiang et al.

Figure 8:
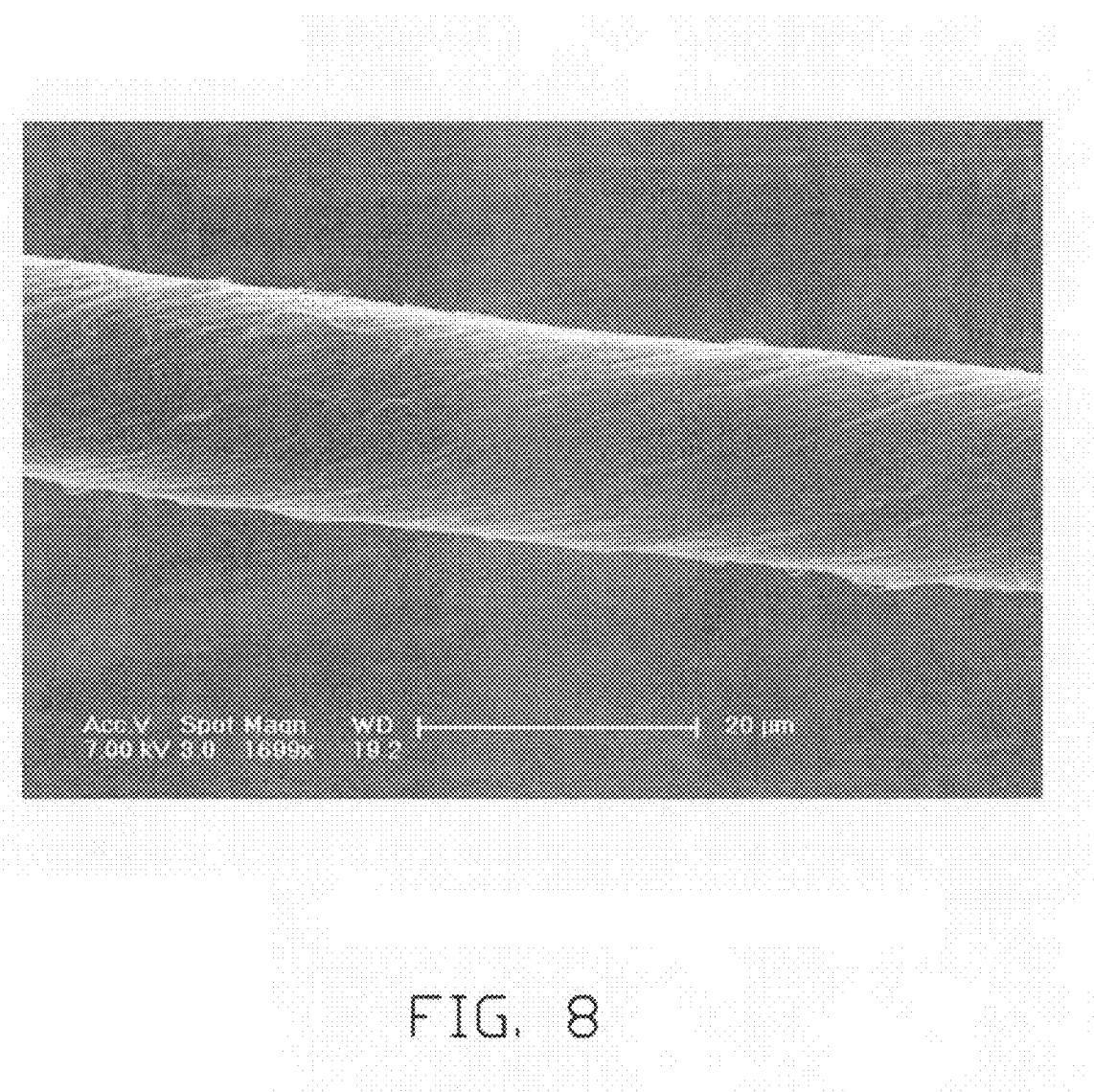
FIG. 8 is an SEM image of a twisted carbon nanotube wire used in the apparatus of FIG. 1.

The twisted carbon nanotube wire can be formed by twisting a drawn carbon nanotube film by using a mechanical force to turn the two ends of the drawn carbon nanotube film in opposite directions. Referring to FIG. 8, the twisted carbon nanotube wire includes a plurality of carbon nanotubes oriented around an axial direction of the twisted carbon nanotube wire. The carbon nanotubes are aligned in a helix around the axis of the carbon nanotube twisted wire. More specifically, the twisted carbon nanotube wire includes a plurality of successive carbon nanotube segments joined end-to-end by van der Waals attractive force therebetween. Each carbon nanotube segment includes a plurality of carbon nanotubes substantially parallel to each other and combined by van der Waals attractive force. The carbon nanotube segment has arbitrary length, thickness, uniformity and shape. A length of the carbon nanotube wire can be arbitrarily set as desired. A diameter of the twisted carbon nanotube wire can range from about 0.5 nm to about 100 μm. Further, the twisted carbon nanotube wire can be treated with a volatile organic solvent, before or after being twisted. After being soaked by the organic solvent, the adjacent parallel carbon nanotubes in the twisted carbon nanotube wire will bundle together, due to the surface tension of the organic solvent as the organic solvent volatilizes. The specific surface area of the twisted carbon nanotube wire will decrease, and the density and strength of the twisted carbon nanotube wire will be increased. It is understood that the twisted and non-twisted carbon nanotube cables can be produced by methods that are similar to the methods of making twisted and non-twisted carbon nanotube wires.

The stability of the apparatus 10 is relatively better because the carbon nanotube wire structure has a higher strength. Thus, the lifespan of the apparatus 10 is relatively longer compared to the prior art.

In one embodiment, the carbon nanotube structure 14 is composed of at least one carbon nanotube film and at least one carbon nanotube wire structure. The carbon nanotubes in the carbon nanotube film are substantially parallel to the carbon nanotube wire structures.

The carbon nanotubes have characteristics very close to an absolute blackbody. The carbon nanotubes have uniform absorption over the entire electromagnetic spectrum including radio, microwave through far infrared, near infrared, visible, ultraviolet, X-rays, gamma rays, high energy gamma rays, and so on. The carbon nanotube structure 14 absorbs the electromagnetic wave 22 and converts the electromagnetic energy into heat energy. The heat capacity per unit area of the carbon nanotube structure 14 can be extremely low, such as less than $2 \times 10^{-4}$ J/cm$^2 \cdot$K. In one embodiment, the heat capacity per unit area of the carbon nanotube structure 14 is less than or equal to about $1.7 \times 10^{-6}$ J/cm$^2 \cdot$K. The temperature of the carbon nanotubes can rapidly change with the intensity change of the incident electromagnetic waves. According to blackbody radiation theory, the carbon nanotube structure 14 can emit visible light when the temperature of the carbon nanotube structure 14 increases to a higher temperature from absorbing a strong electromagnetic wave 22 such as electromagnetic waves 22 emitted by a laser. In one embodiment, the carbon nanotube structure 14 can emit the visible light when the temperature of the carbon nanotube structure 14 is about 800K to about 2400K. The wavelengths of the visible light emitted from the carbon nanotube structure 14 are different in accordance to the different temperatures, thus a color of the visible light changes correspondingly. Specifically, when the temperature of the carbon nanotube structure 14 changes from about 800K to about 2400K, the color of the visible light emitted from the carbon nanotube structure 14 successively changes from dark red to red, from red to orange, from orange to yellow, and from yellow to white according to a "color temperature effect." Thus, the color of the visible light emitted from the carbon nanotube structure 14 gradually changes from a warmer color to a colder color as the temperature of the carbon nanotube structure 14 increases, namely, as the intensity of the visible light gradually increases. Furthermore, the temperature of the carbon nanotube structure 14 can be determined by observing the color of the visible light emitted therefrom.

Figure 9:
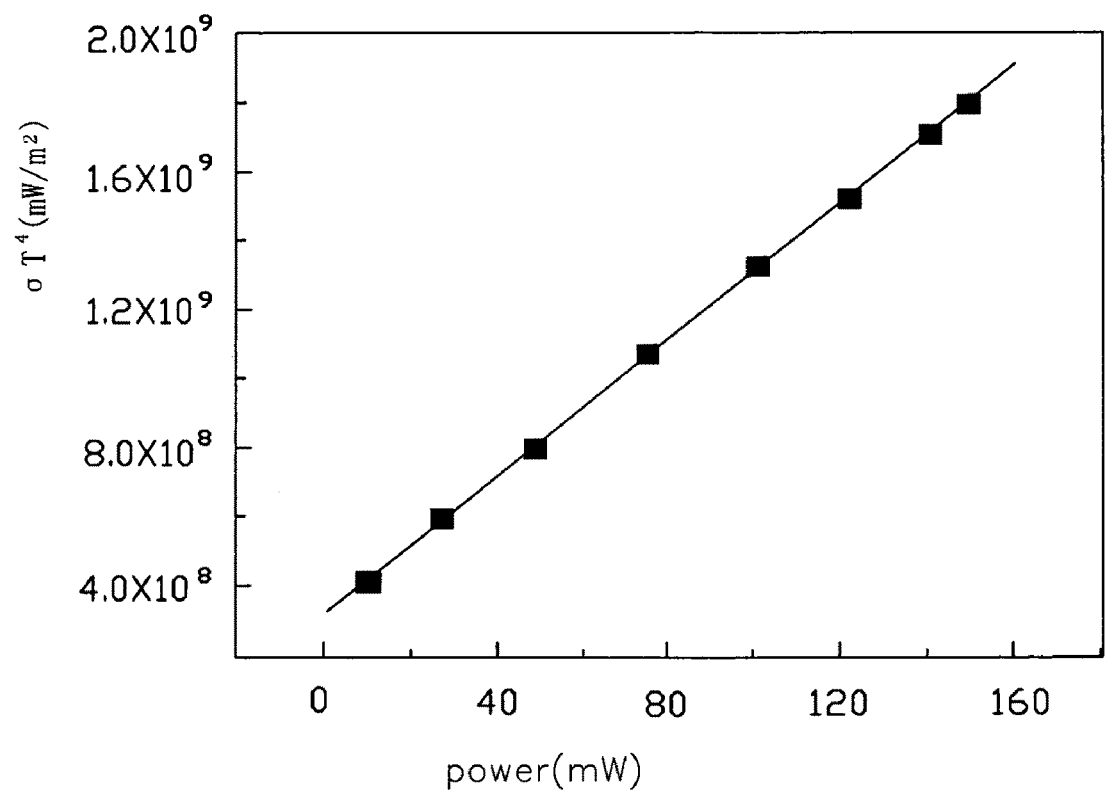
FIG. 9 is a diagram showing a relationship between a total energy of visible light emitted per unit area of a carbon nanotube structure and a power of an electromagnetic wave incident on the apparatus of FIG. 1.

Referring to FIG. 9, in one embodiment, the relation between the total energy of the visible light emitted per unit area of the drawn carbon nanotube film and the power of the incident electromagnetic wave is shown for a drawn carbon nanotube film irradiated with different powers of electromagnetic waves 22. The total energy of the visible light emitted per unit area of the drawn carbon nanotube film can be represented by $\sigma T^4$, wherein $\sigma$ represents the Stefan-Boltzmann constant, and T represents the temperature of the drawn carbon nanotube film when it is being irradiated. The longitudinal axis represents $\sigma T^4$, and the horizontal axis represents the power of the incident electromagnetic wave. The $\sigma T^4$ and the power of the incident electromagnetic wave have a linear relationship. Thus, the greater the power of the electromagnetic wave, the greater the absorption of the electromagnetic wave by the carbon nanotube structure 14, the higher the temperature of the carbon nanotube structure 14, and the greater the intensity of the visible light emitted from the carbon nanotube structure 14. In one embodiment, the response speed of the carbon nanotube structure 14 is fast due to the smaller heat capacity and the larger heat radiating area, the response time being from about 5 milliseconds (ms) to about 200 ms.

The thickness of the carbon nanotube structure 14 is arbitrary. When the thickness of the carbon nanotube structure 14 is thinner, the temperature of the carbon nanotube structure 14 can increase rapidly from absorbing the electromagnetic wave 22, thereby emitting the visible light in the vacuum chamber 12. When the thickness of the carbon nanotube structure 14 is thicker, the strength of the carbon nanotube structure 14 is stronger, but heat radiation of the carbon nanotube structure 14 is lowered, thus the response speed of the carbon nanotube structure 14 is slower. For greater effect, the thickness of the carbon nanotube structure 14 can be chosen to be in a range from about 0.5 nanometers to about 1 millimeter. In one embodiment, the carbon nanotube structure 14 is a monolayer drawn carbon nanotube film.

A shape of the vacuum chamber 12 is not limited. The vacuum chamber 12 has an incidence window 122 and an observation window 124. The incidence window 122 is opposite to and spaced apart from the carbon nanotube structure 14, thus the electromagnetic wave 22 can pass entirely through the incidence window 122 and irradiate the surface of the carbon nanotube structure 14. The surface of the carbon nanotube structure 14 opposite to the incidence window 122 can be observed through the observation window 124.

The incidence window 122 can be made of a material which can allow transmission of the electromagnetic wave 22 therethrough, thus, the choice of the material depends on the wavelength of the incident electromagnetic wave. Specifically, the material of the incidence window 122 can be quartz when the electromagnetic wave 22 is visible light or ultraviolet, and the material of the incidence window 122 can be gallium arsenide (GaAs) when the electromagnetic wave 22 is infrared.

The observation window 124 can be made of a material which can allow transmission of visible light such as quartz or glass.

Furthermore, the apparatus 10 for detecting the polarizing direction of the electromagnetic wave can include a supporting device 16 disposed in the vacuum chamber 12. The supporting device 16 can support the carbon nanotube structure 14 and rotate in a plane. The carbon nanotube structure 14 attached on the supporting device 16 can rotate with the rotation of the supporting device 16.

A shape of the supporting device 16 is not limited, and can be, for example, a plane structure, a curved surface structure, a frame structure, a rod structure, or an irregular structure. When the supporting device 16 defines a surface, the carbon nanotube structure 14 can be directly disposed on the surface of the supporting device 16, and the carbon nanotube structure 14 can be entirely supported by the supporting device 16. The supporting device 16 can prevent the carbon nanotube structure 14 from being easily destroyed, thus the carbon nanotube structure 14 can receive stronger incident electromagnetic waves. When the supporting device 16 is a hollow structure, the carbon nanotube structure 14 can partly keep contact with the supporting device 16, and the rest of the carbon nanotube structure 14 can be free-standing, so that the heat radiation of the carbon nanotube structure 14 is increased because of less contact area with the supporting device 16. Thus, the temperature changes of the carbon nanotube structure 14 are faster, and the color changes and the intensity changes of the visible light emitted from the carbon nanotube structure 14 is more responsive to the temperature changes of the carbon nanotube structure 14.

The supporting device 16 can be made of rigid material such as diamond, glass, and quartz, or flexible material such as flexible plastic and resin. In one embodiment, the supporting device 16 can be made of a material having a relatively low thermal conductivity. The supporting device 16 with a low thermal conductivity can prevent excess thermal energy emitted from the carbon nanotube structure 14 and also prevent the reduction of the speed of the temperature changes of the carbon nanotube structure 14.

In step (b), the electromagnetic wave emission source 20 and the apparatus 10 can cooperatively detect the polarizing direction of the electromagnetic wave 22. The electromagnetic wave emission source 20 can be opposite to and spaced from the apparatus 10, thus the electromagnetic wave 22 emitted from the electromagnetic wave emission source 20 can pass through the incidence window 122 of the apparatus 10 and transmit to the surface of the carbon nanotube structure 14. In one embodiment, the electromagnetic wave 22 irradiates the surface of the carbon nanotube structure 14 which is substantially perpendicular to the travel direction of the electromagnetic wave 22. If the distance between the electromagnetic wave emission source 20 and the apparatus 10 is great, the electromagnetic wave 22 emitted from the electromagnetic wave emission source 20 can be transmitted to the surface of the carbon nanotube structure 14 by an optical fiber.

A frequency of the electromagnetic wave 22 emitted from the electromagnetic wave emission source 20 is not limited, for example, the electromagnetic wave 22 can be radio, microwave through far infrared, near infrared, visible, ultraviolet, X-rays, gamma rays, or high energy gamma rays, and so on. In one embodiment, the electromagnetic wave 22 is a light signal having a wavelength in the range from far infrared to ultraviolet, and an intensity of the electromagnetic wave 22 ranges from about 50 mW/mm$^2$ to about 5000 mW/mm$^2$. If the intensity of the electromagnetic wave 22 is less than 50 mw/mm$^2$, the carbon nanotube structure 14 cannot be heated to emit the visible light. Thus, when the intensity of the electromagnetic wave 22 is too low to cause the carbon nanotube structure 14 to emit the visible light, a focusing device 18 can be provided between the vacuum chamber 12 and the emission source 20. The focusing device 18 faces the incidence window 122 of the apparatus 10, and focuses the electromagnetic wave 22 emitted from the electromagnetic wave emission source 20, thus increasing the intensity of the electromagnetic wave 22 reaching the carbon nanotube structure 14 to provide sufficient heat for the carbon nanotube structure 14.

The more electromagnetic waves 22 absorbed by the carbon nanotube structure 14, the higher the temperature of the carbon nanotube structure 14, and the cooler the color of the visible light emitted from the carbon nanotube structure 14, and vice versa. Thus, the temperature of the carbon nanotube structure 14 can be determined by the color of the visible light emitted from the carbon nanotube structure 14, and then the quantity of the electromagnetic wave 22 absorbed by the carbon nanotube structure 14 can be determined.

Furthermore, to quantitatively detect the intensity of the visible light emitted from the carbon nanotube structure 14, the apparatus 10 can further include a spectrophotometer 19 disposed near the observation window 124 or disposed in the vacuum chamber. The spectrophotometer 19 can detect the intensity of the visible light emitted from the carbon nanotube structure 14, and then the quantity of the electromagnetic wave 22 absorbed by the carbon nanotube structure 14 can be determined according to the intensity of the visible light emitted from carbon nanotube structure 14.

In step (c), the carbon nanotube structure 14 is rotated in a plane perpendicular to the travel direction of the electromagnetic wave 22, and the rotating axis can be substantially perpendicular to the surface of the carbon nanotube structure 14. The rotating degree of the carbon nanotube structure 14 can be at least 90 degrees. Furthermore, the carbon nanotube structure 14 disposed on the supporting device 16 can be rotated by rotating the supporting device 16. The carbon nanotube structure 14 is rotated while being irradiated by the electromagnetic wave 22. When the polarizing direction of the electromagnetic wave 22 is about parallel to the length orientation of the carbon nanotubes, more of the electromagnetic wave 22 is absorbed by the carbon nanotube structure 14, and thus, the temperature of the carbon nanotube structure 14 is higher, and the intensity of the visible light emitted from the carbon nanotube structure 14 is stronger, and the color of the visible light is cooler. When the polarizing direction of the electromagnetic wave 22 is perpendicular to the length orientation of the carbon nanotubes, most of the electromagnetic waves 22 can pass through the carbon nanotube structure 14, thus, the temperature of the carbon nanotube structure 14 is lower, the intensity of the visible light emitted from the carbon nanotube structure 14 is weaker, and the color of the visible light is warmer. Thus, the color of the visible light emitted from the carbon nanotube structure 14 can change with changes of the angle between the polarizing direction of the electromagnetic wave 22 and the length orientation of the carbon nanotubes during the rotations. Furthermore, the polarizing direction of the electromagnetic wave 22 can be determined by observing the color changes of the visible light emitted from the carbon nanotube structure 14 during rotation. Specifically, when the angle between the polarizing direction of the electromagnetic wave 22 and the length orientation of the carbon nanotubes changes from 0 degrees to 90 degrees, the temperature of the carbon nanotube structure 14 changes from high to low, the intensity of the visible light emitted from the carbon nanotube structure 14 changes from strong to weak, and the color of the visible light emitted from the carbon nanotube structure 14 changes from cool to warm. Thus, when the color of the visible light emitted from the carbon nanotube structure 14 is the coolest during rotation of the carbon nanotube structure 14, the length orientation of the carbon nanotubes in the carbon nanotube structure 14 is the polarizing direction of the electromagnetic wave 22. The length orientation of the carbon nanotubes in the carbon nanotube structure 14 can be known beforehand, and thus the polarizing direction of the electromagnetic wave 22 can be determined.

Figure 10:
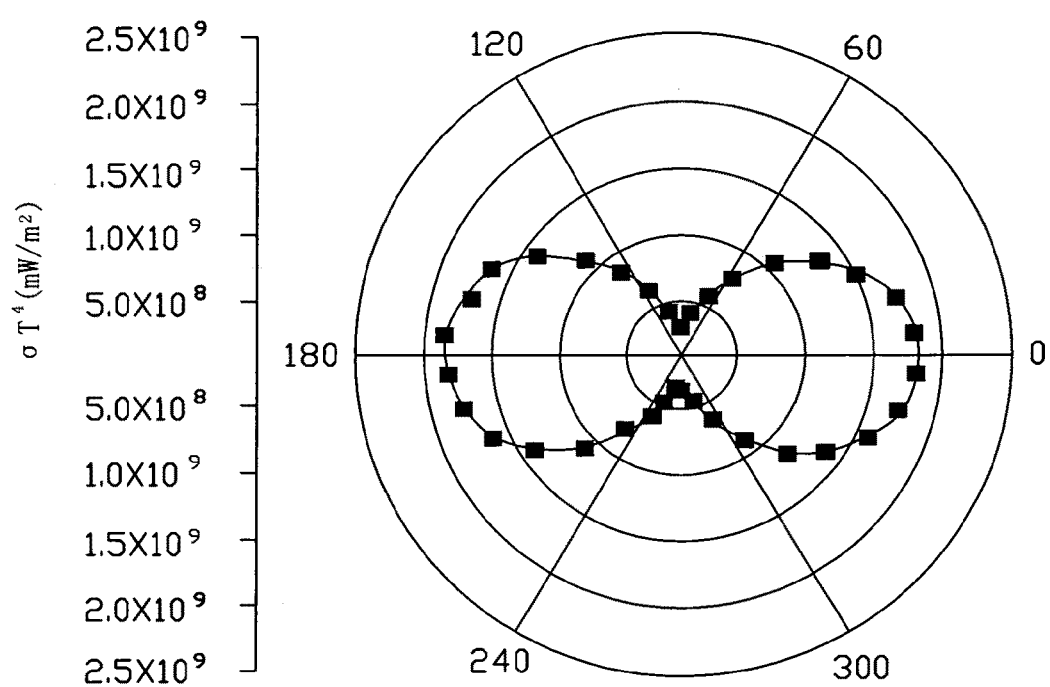
FIG. 10 is a diagram showing a relationship between a total energy of visible light emitted per unit area of the carbon nanotube structure and an angle between the polarizing direction of the electromagnetic wave and a length orientation of carbon nanotubes in the carbon nanotube structure in the apparatus of FIG. 1.

Referring to FIG. 10, the relation between $\sigma T^4$ of the carbon nanotube structure 14 and the angle between the length orientation of the carbon nanotubes and the polarizing direction of the electromagnetic wave 22 is quantitatively measured by the spectrophotometer 19 according to one embodiment. In this embodiment, the carbon nanotube structure 14 is a drawn carbon nanotube film. The electromagnetic wave 22 is a focused infrared, the carbon nanotube structure 14 can absorb the focused infrared and emit visible light.

In FIG. 10, the $\sigma T^4$ of the drawn carbon nanotube film is the largest when the length orientation of the carbon nanotubes in the drawn carbon nanotube film is substantially parallel to the polarizing direction of the electromagnetic wave 22, namely, the intensity of the visible light emitted from the drawn carbon nanotube film is at its strongest. The $\sigma T^4$ of the drawn carbon nanotube film is the smallest when the length orientation of the carbon nanotubes in the drawn carbon nanotube film is substantially perpendicular to the polarizing direction of the electromagnetic wave 22, namely, the intensity of the visible light emitted from the drawn carbon nanotube film is at its weakest. Thus, the greatest amount of the electromagnetic wave 22 with polarizing direction substantially parallel to the length orientation of the carbon nanotubes will be absorbed by the carbon nanotube structure 14, and the temperature of the carbon nanotube structure 14 will be at its highest. Thus, the polarizing direction of the electromagnetic wave 22 can be determined according to the color of the visible light.

The method for detecting the polarizing direction of the electromagnetic wave is simple. The polarizing direction of the electromagnetic wave can be simply detected by rotating the carbon nanotube structure and observing the color changes of the visible light emitted from the carbon nanotube structure, or measuring intensity changes of the visible light emitted from the carbon nanotube structure during rotation. The structure of the apparatus for detecting the polarizing direction of the electromagnetic wave is simple and has a low cost. The carbon nanotube structure is a free-standing structure, thus the strength of the carbon nanotube structure is stronger, and the useful lifespan of the carbon nanotube structure is longer. The carbon nanotubes have a uniform absorption ability over the entire electromagnetic spectrum.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

It is also to be understood that above description and the claims drawn to a method may include some indication in reference to certain steps. However, the indication used is only to be viewed for identification purposes and not as a suggestion as to an order for the steps.

What is claimed is:

1. A method for detecting a polarizing direction of an electromagnetic wave, the method comprising:
   providing a carbon nanotube structure in a vacuum environment, the carbon nanotube structure consisting of a plurality of carbon nanotubes arranged along a substantially same direction;
   irradiating a surface of the carbon nanotube structure by an electromagnetic wave having a polarizing direction thereby the carbon nanotube structure absorbing the electromagnetic wave and emitting a visible light in the vacuum environment;
   rotating the carbon nanotube structure around a rotating axis as the carbon nanotube structure is irradiated by the electromagnetic wave, wherein the rotating axis is substantially perpendicular to the surface of the carbon nanotube structure irradiated by the electromagnetic wave; and
   determining the polarizing direction of the electromagnetic wave according to color changes of the visible light emitted from the carbon nanotube structure by a spectrophotometer.

2. The method as claimed in claim 1, wherein an intensity of the electromagnetic wave ranges from 50 mW/mm$^2$ to 5000 mW/mm$^2$.

3. The method as claimed in claim 1, wherein the vacuum environment has an incidence window for passing through the electromagnetic wave.

4. The method as claimed in claim 3, wherein when the intensity of the electromagnetic wave is less than 50 mW/mm$^2$, a focusing device is provided to face the incidence window to focus the electromagnetic wave.

5. The method as claimed in claim 1, wherein a focusing device is provided outside of the vacuum environment to focus the electromagnetic wave.

6. The method as claimed in claim 1, further comprising:
providing a measuring device outside of the vacuum environment; and
measuring changes of the intensity of the visible light emitted from the carbon nanotube structure by the measuring device during rotation of the carbon nanotube structure.

7. The method as claimed in claim 6, wherein the intensity of the visible light emitted from the carbon nanotube structure is strongest when the polarizing direction of the electromagnetic wave is substantially parallel to a length orientation of the carbon nanotubes, and the intensity of the visible light emitted from the carbon nanotube structure is weakest when the polarizing direction of the electromagnetic wave is substantially perpendicular to the length orientation of the carbon nanotubes.

8. The method as claimed in claim 1, wherein the color of the visible light emitted from the carbon nanotube structure is coolest when the polarizing direction of the electromagnetic wave is substantially parallel to a length orientation of the carbon nanotubes, and the color of the visible light emitted from the carbon nanotube structure is warmest when the polarizing direction of the electromagnetic wave is substantially perpendicular to the length orientation of the carbon nanotubes.

9. The method as claimed in claim 1, wherein the carbon nanotube structure is rotated at least 90 degrees around the rotating axis.

10. An apparatus for detecting a polarizing direction of an electromagnetic wave, the apparatus comprising:
a vacuum chamber comprising an incidence window;
a carbon nanotube structure comprising a plurality of carbon nanotubes arranged along a substantially same direction; and
a spectrophotometer for measuring an intensity of the visible light emitted from the carbon nanotube structure, wherein the spectrophotometer is positioned opposite to the carbon nanotube structure;
wherein the incidence window is opposite to and spaced apart from the carbon nanotube structure, and the carbon nanotube structure is configured to emit a visible light when an electromagnetic wave irradiates the carbon nanotube structure via the incidence window.

11. The apparatus as claimed in claim 10, further comprising an observation window for observing the carbon nanotube structure.

12. The apparatus as claimed in claim 10, wherein the carbon nanotube structure comprises at least one carbon nanotube film, the at least one carbon nanotube film comprises the plurality of carbon nanotubes arranged approximately parallel to a surface of the at least one carbon nanotube film.

13. The apparatus as claimed in claim 12, wherein the at least one carbon nanotube film is a plurality of stacked carbon nanotube films or a plurality of coplanar carbon nanotube films.

14. The apparatus as claimed in claim 10, wherein the carbon nanotube structure comprises at least one carbon nanotube wire structure.

15. The apparatus as claimed in claim 14, wherein the carbon nanotube structure is one carbon nanotube wire structure, the carbon nanotube wire structure is bent orderly in a plane.

16. The apparatus as claimed in claim 14, wherein the carbon nanotube structure comprises a plurality of carbon nanotube wire structures arranged approximately parallel to each other.

17. The apparatus as claimed in claim 14, wherein the at least one carbon nanotube wire structure comprises at least one non-twisted carbon nanotube wire, the at least one non-twisted carbon nanotube wire comprises a plurality of carbon nanotubes arranged substantially parallel to an axis of the at least one non-twisted carbon nanotube wire.

18. The apparatus as claimed in claim 14, wherein the at least one carbon nanotube wire structure comprises at least one twisted carbon nanotube wire, the at least one twisted carbon nanotube wire comprises a plurality of carbon nanotubes aligned in a helix around an axis of the at least one twisted carbon nanotube wire.

19. The apparatus as claimed in claim 10, wherein the carbon nanotube structure is a free-standing structure.

20. The apparatus as claimed in claim 10, further comprising a supporting device, wherein the carbon nanotube structure is supported by the supporting device.

21. The apparatus as claimed in claim 10, further comprising a focusing device for focusing the electromagnetic wave, wherein the focusing device is opposite to and spaced from the carbon nanotube structure.

22. A method for detecting a polarizing direction of an electromagnetic wave, the method comprising:
providing a carbon nanotube structure in a vacuum environment, the carbon nanotube structure comprising a plurality of carbon nanotubes arranged along a substantially same direction;
irradiating a surface of the carbon nanotube structure by an electromagnetic wave having a polarizing direction thereby the carbon nanotube structure absorbing the electromagnetic wave and emitting a visible light in the vacuum environment;
rotating the carbon nanotube structure around a rotating axis as the carbon nanotube structure is irradiated by the electromagnetic wave, wherein the rotating axis is substantially perpendicular to the surface of the carbon nanotube structure irradiated by the electromagnetic wave; and
determining the polarizing direction of the electromagnetic wave according to color changes of the visible light emitted from the carbon nanotube structure by a spectrophotometer;
wherein the determining comprises determining the polarizing direction being substantially parallel to a length orientation of the carbon nanotubes when the color of the visible light emitted from the carbon nanotube structure is coolest, and determining the polarizing direction being substantially perpendicular to the length orientation of the carbon nanotubes when the color of the visible light emitted from the carbon nanotube structure is warmest.

* * * * *